United States Patent
Stubbs

[11] Patent Number: 5,245,853
[45] Date of Patent: Sep. 21, 1993

[54] TAPER ROLLING - DIRECT LENGTH MEASUREMENT

[75] Inventor: Dennis Stubbs, Sheffield, England

[73] Assignee: Davy McKee (Sheffield) Limited, Sheffield, England

[21] Appl. No.: 793,360

[22] PCT Filed: Jun. 18, 1990

[86] PCT No.: PCT/GB90/00934
§ 371 Date: Feb. 10, 1992
§ 102(e) Date: Feb. 10, 1992

[87] PCT Pub. No.: WO90/15678
PCT Pub. Date: Dec. 27, 1990

[30] Foreign Application Priority Data
Jun. 19, 1989 [GB] United Kingdom ............... 8914012

[51] Int. Cl.⁵ .............................................. B21B 37/14
[52] U.S. Cl. ........................................ 72/421; 72/240
[58] Field of Search ................. 72/24, 27, 420, 421, 72/240, 9, 12, 255; 29/DIG. 41

[56] References Cited

U.S. PATENT DOCUMENTS

| | | | |
|---|---|---|---|
| 3,417,592 | 12/1968 | Fielding | 72/199 |
| 3,435,650 | 4/1969 | Forster et al. | 72/421 |
| 3,696,651 | 10/1972 | Harrison | 72/420 |
| 3,750,436 | 8/1973 | Harrison et al. | 72/421 |
| 3,793,868 | 2/1974 | Wilson | 72/240 |
| 4,224,816 | 9/1980 | Elhaus et al. | 72/9 |
| 4,280,351 | 7/1981 | Wilson | 72/240 |
| 4,817,411 | 4/1989 | Bennett et al. | 72/255 |
| 4,959,099 | 9/1990 | Wilson | 72/240 |

FOREIGN PATENT DOCUMENTS

| | | | |
|---|---|---|---|
| 59-35701 | 8/1984 | Japan | 72/240 |
| 696276 | 11/1979 | U.S.S.R. | |
| 1138201 | 2/1985 | U.S.S.R. | |
| 1089332 | 11/1967 | United Kingdom | 72/240 |
| 2050220A | 1/1981 | United Kingdom | |

Primary Examiner—Lowell A. Larson
Assistant Examiner—Donald M. Gurley
Attorney, Agent, or Firm—Lee, Mann, Smith, McWilliams, Sweeney & Ohlson

[57] ABSTRACT

When deforming an elongate workpiece, as by forging, rolling, or the like, it is necessary to know the exact position of the workpiece along its length with respect to the deforming device. To this end, one end of the workpiece is secured to a carriage in abutting relation with a stop member and the carriage is moved in the direction away from the deforming device. The position of the stop member with respect to the deforming device is continuously detected thus giving an indication of the position of the workpiece with respect to the deforming device.

7 Claims, 1 Drawing Sheet

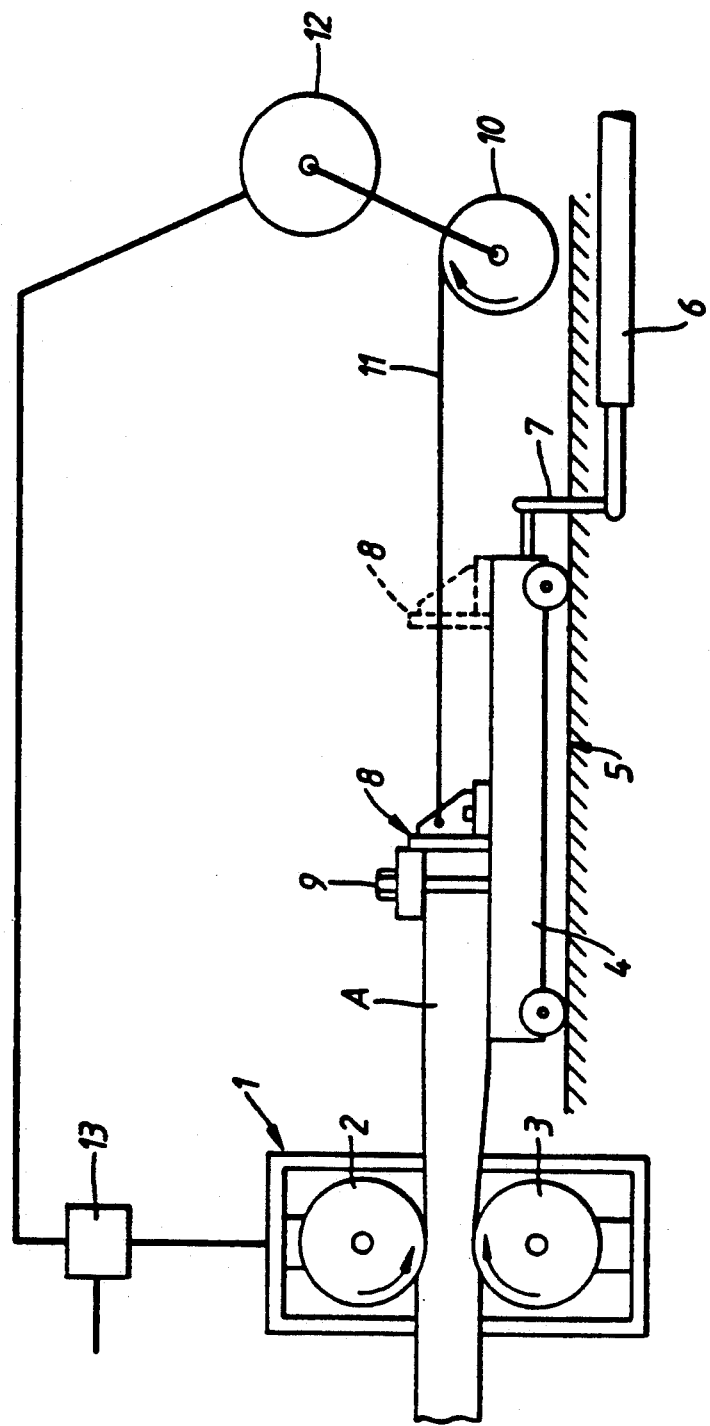

TAPER ROLLING - DIRECT LENGTH MEASUREMENT

This invention relates to a method of, and apparatus for, deforming an elongate workpiece over at least part of its length. A particular, but not sole, application of the invention is to the rolling of a workpiece to form a thickness profile which is tapered along its length Such a workpiece may form part of a leaf spring.

When rolling the workpiece, the taper may be linear, parabolic, exponential or a combination of these according to the requirements of the spring design. It is most important, however, that the taper is consistently produced on the workpiece and that the thickness profile of the workpiece is accurately reproduced along the length of the workpiece.

In accordance with a first aspect of the present invention, in a method of deforming at least part of the length of an elongate workpiece in which a movable stop member on a carriage is displaced in the direction of movement of the carriage to a predetermined position on the carriage; an end portion of the workpiece is secured to the movable carriage with the end of the workpiece in abutting relation with the stop member, and the carriage is driven away from a deforming means to draw the workpiece through the deforming means; characterised in that a signal representing the position of the stop member with respect to the deforming means is continuously obtained and is employed to control the deforming means.

By ensuring that the end portion of the workpiece is secured to the movable carriage in abutting relation with the movable stop member, and by continuously detecting the position of the stop member with respect to the deforming means, the exact position of the workpiece with respect to the deforming means is known. This enables the workpiece to be deformed with a correct relationship between the deformation of the workpiece and the length of the workpiece.

The deforming means is conveniently a rolling mill and the gap between the rolls is varied in response to the detected signal to roll a taper on at least part of the length of the workpiece.

In accordance with a second aspect of the invention, apparatus for deforming at least part of the length of an elongate workpiece comprises deforming means; a carriage displaceable towards and away from the deforming means, said carriage having a stop member thereon which is displaceable relative to the carriage in the direction of movement of the carriage; and clamping means for securing an end portion of a workpiece to the carriage with the end of the workpiece in abutting relation with the stop member; means for displacing the carriage towards and away from the deforming means; characterised in the provision of a position detector which produces a signal which represents the position of the stop member with respect to the deforming means, said signal being employed to control the deforming means.

The deforming means is usually a rolling mill having an adjustable gap between the rolls. It could, however, be a forging press or a bending machine.

In order that the invention may be more readily understood, it will now be described, by way of example only, with reference to the accompanying drawing which shows diagrammatically apparatus in accordance with the present invention.

A rolling mill is indicated by reference numeral 1. A pair of work rolls 2, 3 are rotatably mounted in a mill housing and the position of at least one of the rolls is adjustable in order to vary the roll gap between them.

A wheeled carriage 4 is guided for displacement along a track indicated by reference numeral 5. The direction of displacement of the carriage along the track is towards and away from the rolling mill. The carriage is displaced along the track by any convenient means, such as a fluid operable piston and cylinder device 6, positioned below the track and having its piston releasably coupled to the carriage by a coupling 7.

On the carriage 4 there is a stop member 8 which can be moved along the length of the carriage (as indicated by broken lines) and held in the chosen position on the carriage. A clamping mechanism 9 serves to releasably clamp an elongate workpiece A to the carriage with one end of the workpiece abutting against the stop member 8.

At a position spaced from the rolling mill, in the direction of movement of the carriage, there is a rotatable drum 10 on which a flexible draw wire or tape 11 is wound. One end of the draw wire is connected to the stop member 8. The drum is biased for rotation such that the draw wire is always held in tension. The drum 10 may form part of an encoder but is conveniently connected to a rotary encoder 12 so that rotation of the drum causes rotation of the encoder. The encoder produces an electrical signal representative of the angle of rotation and, consequently, the electrical signal represents the position of the stop member 8 with respect to the drum 10. As the position of the drum 10 is a fixed known distance from the rolling mill 1, the output of the encoder represents the position of the stop member with respect to the rolling mill. As the stop member 8 can be re-positioned at convenient locations on the carriage in the direction of its movement, the output from the encoder represents the movement of the carriage plus any movement of the stop member relative to the carriage.

Since the workpiece is secured to the carriage with an end abutting the stop member 8, the encoder provides an accurate indication of the position of the workpiece with respect to the rolls of the rolling mill. By this arrangement the true position of the workpiece is measured relative to the rolls and it enables the workpiece to be rolled with a correct relationship between the rolled thickness of the workpiece and the position of the workpiece. Means (not shown) could be provided for indicating the position of the stop member on the carriage.

The output from the encoder 12 is supplied to a controller 13 which also receives a signal representative of the gap between the rolls 2, 3. The controller adjusts the roll gap in accordance with a programme stored in the controller so that, as the workpiece A is drawn through the gap, a taper is rolled on at least part of the length of the workpiece.

Furthermore, because the position of the workpiece relative to the rolls is always known, the achieved roll positions can be recorded frequently along the length of the workpiece during rolling and compared with a required profile in order to indicate any profile error which may exist. In subsequent rollings, corrections can be made by the control system to improve the tolerance.

The encoder 12 may be a 13 bit absolute encoder sold by Ferranti (UK) Ltd. of London, England.

I claim:

1. A method of deforming at least part of the length of an elongate workpiece in a deforming means comprising the steps of arranging a movable carriage relative to the deforming means so that the carriage can be driven towards and away from the deforming means;

displacing a movable stop on the carriage in the direction of movement of the carriage to a predetermined position and holding the stop in that position;

abutting an end portion of the workpiece to be deformed against the stop member in said predetermined position;

securing the workpiece to the carriage;

driving the carriage away from the deforming means to draw the workpiece through the deforming means to thereby deform the workpiece;

continuously obtaining a signal representing the position of the stop member with respect to the deforming means; and employing the signal to operate the deforming means.

2. A method as claimed in claim 1, wherein a position detector is located at a position spaced by a known distance from the deforming means in the direction of movement of the carriage and the detector produces a signal representative of the position of the stop member with respect to the detector.

3. A method of rolling a taper on at least part of the length of an elongate workpiece in a rolling mill comprising the steps of arranging a movable carriage relative to the rolling mill so that the carriage can be driven towards and away from the rolling mill;

displacing a movable stop on the carriage in the direction of movement of the carriage to a predetermined position and holding the stop in that position;

abutting an end portion of the workpiece to be deformed against the stop member in said predetermined position;

securing the workpiece to the carriage;

driving the carriage away from the rolling mill to draw the workpiece between the rolls of the mill as the workpiece is rolled;

continuously obtaining a signal representing the position of the stop member with respect to the rolling mill; and employing the signal to adjust the gap between the rolls of the rolling mill.

4. Apparatus for deforming at least part of the length of an elongate workpiece comprising a rolling mill having a pair of rolls and means for adjusting the gap between the rolls;

a carriage displaceable towards and away from the rolling mill;

a stop member on the carriage, said stop member being displaceable relative to the carriage in the direction of movement of the carriage to a predetermined position and means for holding the stop member in the predetermined position;

clamping means for securing the workpiece to the carriage with an end portion of the workpiece in abutting relation with the stop member;

means for displacing the carriage towards and away from the rolling mill;

a position detector arranged to produce continuously a signal representing the position of the stop member with respect to the rolling mill; and a controller arranged to adjust the gap between the rolls of the rolling mill in response to the signal received from the detector as the carriage is displaced away from the rolling mill.

5. Apparatus as claimed in claim 4, wherein the position detector (10, 12) is located at a position spaced from the rolling mill by a known distance in the direction of movement of the carriage and the position of the stop member relative to the position detector is determined.

6. Apparatus as claimed in claim 5, in which the position detector includes a rotatable drum which is connected to the stop member by a flexible member held under tension whereby linear displacement of the stop member causes angular rotation of the drum.

7. Apparatus as claimed in claim 6, wherein the flexible member (11) is a wire or tape secured to the drum (10) by biasing means which keep the wire or tape under tension.

* * * * *